Patented Oct. 26, 1943

2,332,801

UNITED STATES PATENT OFFICE 2,332,801

VEGETABLE PROTEIN RESIN PRODUCT AND PREPARATION THEREOF

Carl S. Leonardson and Donald J. White, Seattle, Wash., assignors to The Borden Company, New York, N. Y., a corporation of New Jersey No Drawing. Application May 3, 1940, Serial No. 333,245

17 Claims. (Cl. 260—6)

This invention relates to resin type reaction products of a vegetable protein with a urea and formaldehyde that are especially suitable for use as wood glues, but that may be used also as sizing or finishing materials for wood, cloth, paper and the like, and to methods of preparing and using such reaction products.

Urea-formaldehyde resin glues have been used heretofore for gluing wood, laminating of veneers to form plywood and the like. Such materials are condensation products known as resin glues and are usually marketed as aqueous solutions containing about 60% solids and having a viscosity at 70° F. of about 125 R. P. M. taken on a Stormer viscosimeter using a 500 gram weight. During the condensation reaction of urea and formaldehyde, the condensation product resulting from reaction of these ingredients at elevated temperatures gradually becomes more and more viscous as the condensation proceeds. In order to obtain the required viscosity in the product for wood gluing, however, it is necessary to evaporate water from the material at some stage during the condensation, or after the condensation is completed. If the condensation of a straight urea-formaldehyde product is carried out without evaporating water, the product forms an irreversible gel before a Stormer viscosity of 125 R. P. M. is reached. The usual practice, therefore, in order to obtain a final product having the requisite viscosity and useful life, has been to arrest the reaction well before the final viscosity has been reached and then to remove rapidly a relatively large amount of water, usually by evaporation under reduced pressure. This procedure necessarily gives a final product containing a relatively large amount of solids and increases the cost of making the product.

These glues can be stored at a temperature of 70° F. or lower for fairly long periods of time but they gradually become thicker and more viscous until at last the product changes into a gel that is useless as a glue. Temperature has a marked effect on this useful liquid life, however, and serious problems are presented when it is necessary to store the glues in southern climates because the glues gel much more rapidly when stored at temperatures above 70° F.

When these glues become too thick, they can be thinned out to some extent by the addition of water, but the addition of even small quantities of diluting water have an extremely marked effect on the viscosity.

For example, a straight urea-formaldehyde resin glue with a solids content of 60% and a Stormer viscosity of 87 will, when diluted with water to a solids content of 50%, have a Stormer viscosity of 600.

As a urea-formaldehyde resin glue is diluted with water and it becomes thinner, its bonding strength and also its general value as a glue for holding veneers of wood together is diminished. For example, veneers glued together under a standard hot pressing procedure with each of the above urea-formaldehyde resin glues of 60% and 50% solids contents, respectively, gave the following results when the usual strength tests made in testing plywood in a Riehle testing machine were carried out. In each case, the same amount of glue on a dry basis was spread on the wood veneers.

Table I

| Type of glue | Viscosity | Dry strength | Wet strength |
|---|---|---|---|
| 60% solids glue | 87 | 215-90 | 190-60 |
| 50% solids glue | 600 | 155-45 | 140-25 |

The first figure in each of the above tests indicates the strength of the plywood strips that were broken in a Riehle testing machine. The second figures after the hyphens in the results given above in each case indicate the percentage of broken fibre that appeared on the broken test piece. The wet shear tests were made after the plywood strips had been soaked in cold water for 48 hours.

It will be apparent from this example that with the straight urea-formaldehyde resin glues, the strength of the glue for purposes of gluing wood veneers together in making plywood diminishes rapidly as the glue is thinned out by dilution with water. In addition, the glue loses the desired spreading qualities as it is diluted and becomes thinner.

It is an object of our invention to provide a urea-formaldehyde type of resin product having the viscosity and consistency required for wood gluing operations which can be prepared without evaporating water from the product at any stage of its preparation, thereby producing a final product containing substantially smaller quantities of solids than are present in the usual straight urea-formaldehyde resin glues.

Another object of the invention is to provide such a resin product having good spreading qualities and a low solids content that also has a high bonding strength.

A further object is the provision of such a new urea-formaldehyde type resin having a long useful life when stored as an aqueous solution at room temperature together with an unusually long life for such a product when stored at higher temperatures.

Another object is to provide such a resin which can be used for gluing veneers of wood together to make plywood, and which, after setting, furnishes a more flexible or less brittle glue film.

Another object is the provision of methods of making and using these new resin types of adhesives having one or more of the foregoing advantageous properties.

Other objects and advantages will be apparent or will be explained in conjunction with the following description of various embodiments of the invention.

It has been discovered that resinous products satisfying the requirements of a good wood glue to a high degree but containing only a relatively small proportion of solids can be prepared by reacting a solution of a vegetable protein with urea and an aldehyde, without the necessity of evaporating water from the materials during the condensation reaction, or after its completion. The various high protein seed meals such as soybean meal, peanut meal and cottonseed meal—preferably in a substantially de-oiled state as sold on the market—may be used as the source of vegetable protein. If desired, however, the so-called isolated vegetable proteins may be used, although these usually are more expensive.

Glues prepared according to this invention are thermo-setting and have fully as good and frequently superior bonding strengths compared with straight urea-formaldehyde glues, and they achieve this result in much more dilute solutions than can be used with the urea-formaldehyde glues heretofore known. Also, the glues of this invention will remain in solution in a liquid condition for several months when stored at 70° F., have a comparatively long life when stored at temperatures above 70° F., can be diluted with water if it is necessary to adjust their viscosity, furnish more flexible films after setting than the straight urea-formaldehyde glues, can be dried, as by any of the well known spray drying processes, and thereafter can be reconstituted easily upon mixing with water into a satisfactory glue.

Any of the usual diluting agents or extenders, such as the cereal flours, wheat flour, rye flour and starch, as well as other materials may be mixed with the resin products of this invention after they are prepared. In fact, these vegetable protein-urea-formaldehyde glues may be mixed with unusually large amounts of extenders or filler materials and still provide adequate bonding strength for use in gluing plywood.

Glues are prepared according to the invention by condensing a solution of a vegetable protein with a urea and formaldehyde. The condensation may be carried out by heating the ingredients in a refluxing apparatus to a suitable condensing temperature of around 200° F. or slightly higher until a product having the desired viscosity is obtained. It is unnecessary to evaporate water from the product at any stage of its preparation in order to obtain the final product having the required viscosity. One convenient method of forming the solution of vegetable protein is to employ a solution of some or all of the urea as a solvent for an isolated vegetable protein or the protein portion of a seed meal. The vegetable protein or seed meal may be mixed into a solution of urea until the protein is substantially completely dissolved. All of the urea to be used may be thus mixed or reacted with the vegetable protein before condensation, or only a portion of the urea may be used at this stage. Other means for forming the solution such as the usual alkalies may be employed. Any of the alkaline materials known to act as dissolving agents, such as caustic soda or potash, soda ash or ammonia may be used in aqueous solution to dissolve the vegetable protein.

The solution of vegetable protein may then be mixed with the formaldehyde, and with additional urea if this is needed, and the pH of the mixture of the three ingredients to be reacted is preferably adjusted to approximately 7. A solution of any suitable alkali is usually added for this adjustment.

The substantially neutral homogeneous mixture of vegetable protein, urea and formaldehyde is now heated to a condensing temperature for a few minutes to obtain a partial reaction, and the pH, which has then dropped somewhat, may be further adjusted by addition of a weak acid to about 5.5. This second adjustment of the pH is not essential so long as the condensation is carried out with the pH below 7. Lowering the pH, however, speeds up the reaction and is usually desirable for this reason. The heating is then continued, preferably without any further interruption, until the product has almost reached the desired final viscosity, and the product is then neutralized and cooled. The point at which to neutralize and cool the product may be determined by obtaining samples of the product from time to time and testing them for viscosity. Keeping in mind that the reaction is proceeding while such a sample is being cooled and tested and also while the main body of the product is being cooled, an allowance should be made in selecting the viscosity of the sample tested which will produce the desired viscosity in the final product. Usually the reaction is stopped in time to obtain a final cooled product having a viscosity of about 50 to 200 R. P. M. on a Stormer viscosimeter using a 500 gram weight with the glue at 70° F. While this is a preferred range of viscosity for the final product, it is to be understood that the reaction may be stopped to obtain a higher or lower final viscosity if desired. When the product is neutralized to arrest the condensation, sufficient alkali is usually added to the product to render it slightly alkaline with a pH, for example, of about 7 to 8.5.

The term "a urea," as employed in the specification and claims, is intended to include the chemical compound $NH_2.CO.NH_2$, and other ureas such as phenyl urea and thiourea known to react with formaldehyde by condensation. The terms "aldehyde" and "formaldehyde" as used in the specification and claims are intended to include the various aldehydes that are suitable for producing resins by condensation with urea such as paraformaldehyde and other polymers of formaldehyde, and formaldehyde liberating compounds.

The proportions of vegetable protein to urea and formaldehyde may be varied within rather wide limits, as will be apparent from the examples given below. While the invention is not limited thereto, it is preferable to employ about 10 to 100 parts of a high protein seed meal, or of an isolated vegetable protein, for each 100 parts of the urea. The proportions of urea to formaldehyde may be varied as will be understood by those skilled in the art, good results being obtained by using a mol ratio of about 1 mol of urea to about 1.7 to 2.2 mols of formaldehyde.

By way of illustration and without limiting the invention in any way, the following examples of the preparation of vegetable protein-urea-formaldehyde reaction products according to this invention are given:

*Example I.*—50 lbs. of cold or warm water are placed in a convenient mixer, which is preferably jacketed for steam and fitted with a slow moving agitator. Then 25 lbs. of ordinary, commercial peanut meal which has had substantially all of the oil removed as is common in commercial practice, and has preferably been ground to pass a 200 mesh screen, is added. The meal added to the water is mixed by means of the agitator until the particles are thoroughly wetted and then 25 lbs. of commercial urea is added, the mixing continued, preferably heating while stirring to about 120 or 130° F. The object of heating is primarily for the purpose of being able to prepare the resulting solution more rapidly.

Into a properly jacketed kettle, preferably with a reflux condenser attached and with a proper stirring apparatus, is now placed 270 lbs. formaldehyde with a strength of 37 to 40% free formaldehyde. To this formaldehyde is added 75 lbs. of commercial urea and 100 lbs. of the water-peanut meal-urea mixture referred to above. The complete mixture is stirred until the urea is dissolved and a complete homogeneous mixture results. Thereafter, a determination of the pH of the resulting solution is made and this is adjusted by the addition of a water soluble alkaline material to a substantial neutral point or a pH of about 7. Any suitable alkalies such as caustic soda or trisodium phosphate may be used as the neutralizing material. After this adjustment of the pH has been made, heat is turned into the jacket of the kettle and the temperature is raised to about 209° F. and held at about that point during the reaction. While the chemical reaction is taking place, it is preferable to let the condensate which develops, return to the kettle through the reflux condenser. After the reaction has continued for 15 or 20 minutes, a sample of the liquid is removed from the kettle and its pH determined. The material may show at this stage a pH of about 6 or 6.5. In any case, by means of an acid such as weak formic acid or acetic acid, the contents of the kettle is adjusted to a pH of about 5.5. Thereafter, the heating is continued and the solution held at about 209° F. until a sample of the glue in the kettle shows a viscosity on the Stormer viscosimeter with a 500 gram weight and the glue at 70° F. of approximately 200. When approximately this viscosity is reached, the solution is neutralized with any suitable alkaline material, for example caustic soda, to a pH of approximately 7.0 to 8.5. After this pH adjustment, the resulting glue is preferably cooled by any desired means, to 70° F. or thereabouts, when it is finished and may be removed from the kettle and packed in suitable containers for commercial use. The resulting glue as indicated by this example, will have a Stormer viscosity of about 125 R. P. M. and will contain approximately 45.8% solids, 50.2% water and approximately 4% of free formaldehyde.

*Example II.*—50 lbs. of commercial soybean meal ground to pass a 200 mesh screen, and which has been substantially de-oiled, is mixed with 100 lbs. water and 50 lbs. urea, and a solution of the protein is prepared as described in Example I. The solution thus prepared is then mixed and reacted with 50 lbs. of urea and 270 lbs. of 37 to 40% formaldehyde according to the procedure of Example I. The resulting glue contains 38% solids, 60% water and approximately 2% free formaldehyde.

*Example III.*—50 lbs. cottonseed meal of the usual commercial quality, preferably ground to 200 mesh and substantially de-oiled, is mixed with 100 lbs. water and 50 lbs. urea to form a solution of the protein. This solution is then mixed and reacted with 50 lbs. of urea and 270 lbs. of formaldehyde according to the procedure in Example I. The resulting glue contains 39% solids, 58.5% water and approximately 2.5% free formaldehyde.

*Example IV.*—100 lbs. peanut meal ground to pass 200 mesh and substantially de-oiled, is mixed with 300 lbs. water and 100 lbs. urea to form a solution of the protein. Thereafter, 270 lbs. of formaldehyde is placed in the reaction kettle and the entire amount of peanut meal and urea solution is added without any additional urea, and the reaction is carried out as indicated in Example I. The resulting glue contains 35% solids, 63.5% water and 1.5% free formaldehyde.

A comparison of the strength and bonding qualities of glues prepared according to this invention with commercial urea-formaldehyde resin glues is given in the following tables. The tests carried out to obtain the data in these tables were made by gluing $\frac{1}{10}''$ fir veneers together to form plywood. A prepared liquid glue was spread on both sides of a center or core veneer to obtain about 54.8 lbs. of liquid glue per 1000 square feet of double glue line veneer. The face and back veneers were then laid on the glue spread center veneer and the three veneers pressed together in a hot plate press at a temperature of 220° F. for three and one-half minutes at 125 lbs. per square inch. The plywood was then removed from the press and allowed to thoroughly season, after which it was cut into small pieces for test purposes, tests being made with a series of dry strips on a Riehle testing machine, and another series of tests being made with strips that had been soaked in cold water for 48 hours.

*Table II*

| Type of glue | Solids content of glue | Dry strength | Wet strength |
| --- | --- | --- | --- |
| | *Per cent* | | |
| A. Commercial urea formaldehyde | 62 | 250–80 | 230–45 |
| B. Example I | 45.8 | 250–85 | 235–35 |
| C. Example III | 39 | 235–50 | 210–20 |

The foregoing table offers a comparison of glues of substantially the same viscosities and it is apparent that the glues of this invention provide at least as good, if not superior, bonding strengths in spite of their lower solids contents at the viscosities normally employed. The following table indicates the decidedly inferior strengths obtained when commercial urea-formaldehyde glues are diluted to the same solids content as the glues of this invention. In addition to the lower strengths obtained with the diluted glues, these diluted glues were rendered so thin as to be unsuitable commercially for spreading.

*Table III*

| Type of glue | Solids content of glue | Dry strength | Wet strength |
| --- | --- | --- | --- |
| | *Per cent* | | |
| D. Commercial urea-formaldehyde and water | 45 | 165–45 | 130–20 |
| E. Example I | 45.8 | 250–85 | 235–35 |
| F. Commercial urea-formaldehyde +water | 40 | 170–80 | 160–55 |
| G. Example III | 39 | 235–50 | 210–20 |

In using the above glues for hot plate pressing, 1 lb. of a hardening agent was added to each 100 lbs. of the resin glue. Ammonium chloride is suitable for this purpose and various other hardening agents of the type well known in the art, such as ammonium sulfate, sodium bisulfate, zinc chloride or other acidic salts can be used with glues prepared according to this invention, as well as with the usual urea-formaldehyde resin glues. The percentage of such hardening agents used in the liquid glue will, as is well known, alter to a considerable extent the speed of setting of the glue as soon as the hardening agent has been added.

Glues prepared according to this invention may be used also in the method of making plywood commonly known as "cold pressing" by the addition of a somewhat larger amount of the hardening agent. For example, with 2 lbs. of ammonium chloride to each 100 lbs. of liquid glue, glues prepared according to this invention may be spread on veneers at the rate of 60 lbs. of liquid glue per 1000 sq. feet double glue line, and the veneers then pressed at 150 lbs. pressure for 24 hours at room temperature. The following table offers a comparison of strengths of plywood glued by cold pressing using glues of substantially the same solids contents. 2% of ammonium chloride was added as the hardening agent to each of the glues tested.

*Table IV*

| Type of glue | Solids content of glue | Dry strength | Wet strength |
| --- | --- | --- | --- |
| H. Commercial urea-formaldehyde +water | Per cent 45 | 145-25 | 80-0 |
| I. Example I | 45.8 | 210-75 | 115-0 |

The vegetable protein-urea-formaldehyde products of this invention clearly are reaction products of the three ingredients used and are not to be confused with straight urea-formaldehyde resins to which various extenders have been added. Although the chemical nature of these new reaction products is exceedingly complex, their distinctive nature is clearly evidenced by the distinct properties which they exhibit, particularly when used as glues in the manufacture of plywood. Among their distinctive properties are the good bonding strengths and viscosities that are obtained with solutions of the glues containing less than 50% of solids, their marked improvement in resistance to gelling when stored at higher temperatures of the order of 110° F., and the more flexible glue films that are obtained when these new products have hardened.

In addition, the method of making these resin products is simplified by reason of the fact that the condensation can be carried out to produce commercially satisfactory products without evaporating water under reduced pressure from the materials during the condensation or after its completion.

While the reaction products described herein are particularly suited for use as adhesives in the wood gluing field, they are also suitable for other purposes such as gluing other materials together and for coating or sizing paper, cloth and the like.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A water soluble urea-formaldehyde type of resin product containing a slight amount of free formaldehyde and comprising a reaction product prepared by heating to approximately refluxing temperature formaldehyde with a fluid aqueous solution of a reaction product of a vegetable protein and urea until a thick viscous liquid is obtained.

2. A thermo-setting resin type of glue comprising a liquid reaction product containing free formaldehyde and prepared by mixing and condensing at approximately refluxing temperature formaldehyde with an aqueous solution containing a reaction product of a vegetable protein and urea until a condensation product having a Stormer viscosity of at least about 50 is obtained.

3. A resin type of glue comprising a reaction product prepared by dissolving a vegetable protein in an aqueous solution of urea and heating said solution with about 1.7 to about 2.2 mols of formaldehyde for each mol of urea at approximately refluxing temperature until a viscous liquid glue is obtained.

4. A resin type of glue comprising a reaction product prepared by dissolving a vegetable protein in an aqueous solution of a urea, and heating said solution together with an additional quantity of a urea and formaldehyde at a condensing temperature until a viscous liquid is obtained.

5. A resin type of glue containing free formaldehyde and comprising a reaction product prepared by dissolving the protein of a protein-rich seed meal in an aqueous solution of an alkali, reacting said soltuion with urea, adjusting the pH of the mixture to about 5.5 to about 7, refluxing this reaction product with formaldehyde, and neutralizing the resin product when a viscous liquid reaction product is obtained.

6. A resin type glue as defined in claim 5 in which the seed meal used for preparing the product is soybean meal.

7. A resin type glue as defined in claim 5 in which the seed meal used for preparing the product is peanut meal.

8. A resin type glue as defined in claim 5 in which the seed meal used for preparing the product is cottonseed meal.

9. A method of preparing a urea-formaldehyde resin product comprising heating to a refluxing temperature about 1.7 to about 2.2 mols of formaldehyde for each mol of urea and an aqueous solution containing a reaction product of a vegetable protein and urea until a homogeneous tacky liquid having a Stormer viscosity of at least about 50 is obtained.

10. A method of preparing a resin glue which comprises heating to approximately refluxing temperature formaldehyde and a fluid aqueous solution of a reaction product of urea with a vegetable protein until a viscous reaction product is obtained, the proportion of formaldehyde being sufficient to produce a finished product containing free formaldehyde.

11. A method of preparing a urea-formaldehyde resin glue which comprises dissolving a vegetable protein in an aqueous solution of urea, heating such solution together with about 1.7 to about 2.2 mols of formaldehyde per mol of urea at approximately refluxing temperature, and arresting the condensation reaction when a thick viscous reaction product is obtained.

12. A method of preparing a urea-formaldehyde resin product comprising dissolving a vegetable protein in an aqueous solution of a urea, and heating said solution together with formaldehyde and an additional quantity of a urea at a condensing temperature until a thick viscous reaction product is obtained.

13. A method of preparing a resin glue which comprises dissolving a protein rich seed meal in an aqueous solution of an alkaline protein dissolving reagent until the protein is substantially completely dissolved, reacting said solution with urea, adjusting the pH of the product to about 5.5 to about 7, refluxing the liquid reaction product with about 1.7 to about 2.2 mols of formaldehyde for each mol of urea, and neutralizing the product to arrest the condensation reaction when a viscous liquid reaction product is obtained.

14. A method as defined in claim 13 in which the seed meal is soybean meal.

15. A method as defined in claim 13 in which the seed meal is peanut meal.

16. A method as defined in claim 13 in which the seed meal is cottonseed meal.

17. A method of preparing a resin type of glue comprising forming an aqueous alkaline solution of a vegetable protein, preparing a mixture of a reaction product of said solution with urea and formaldehyde, adjusting the pH of said mixture to about 7, heating said mixture to effect a partial reaction of the ingredients, adjusting the pH of said reacted material to about 5.5, refluxing the reacted material, and neutralizing the product when a thick liquid reaction product is obtained.

CARL S. LEONARDSON.
DONALD J. WHITE.